United States Patent Office 3,062,668
Patented Nov. 6, 1962

3,062,668
DIELECTRIC MATERIALS AND PROCESSES OF MANUFACTURING SAME
André Pierrot, Yves Lescroël, and Nicolle Bernard, Paris, France, assignors to International Telephone and Telegraph Corporation, New York, N.Y., a corporation of Maryland
No Drawing. Filed Feb. 8, 1961, Ser. No. 87,747
Claims priority, application France Mar. 30, 1960
2 Claims. (Cl. 106—39)

The present invention relates to new dielectric materials with high permittivity, particularly suitable for manufacture of small-size decoupling capacitors and capacitors for D.C. voltage supply filters.

The materials which are the object of the invention consist of iron oxide $Fe_2O_3$ and tantalum oxide $Ta_2O_3$, forming solid solutions. These oxide mixtures, made homogeneous by mechanical grinding, are shaped by compression, drawing or extrusion; they are then subjected to a suitable heat treatment.

These new materials, in view of their high permittivity lead to the obtainment of inexpensive capacitors of very small size, particularly suitable for the technique of printed circuits and for use with transistors. They can withstand relatively high temperatures, in view of their nature, which resembles that of ceramics.

In the following description the qualities of the materials studied are characterised by their permittivity, $\epsilon$, and by their loss angle tangent, tg $\delta$, at a certain frequency at a certain temperature and for a certain applied voltage.

These coefficients are measured on a small test capacitor, made with the dielectric material under consideration; the conditions of measurement, temperature, voltage and frequency are specified, since the characteristics of these materials depend greatly upon these conditions.

The materials which are the object of the present invention are characterised by the following compositions. They comprise iron oxide and a small quantity of tantalum oxide comprised between 0.05 and 20% of the total weight. These compositions correspond to a number of molecules of iron oxide $Fe_2O_3$ comprised between 91.7% and 99.98% and to a number of molecules of tantalum oxide comprised between 0.02% and 8.3%. Relatively pure iron oxides and tantalum oxides are employed.

The manufacture of the materials in accordance with the invention is similar to that of all the electric ceramics.

The mixture of the oxides is ground in an iron mill with steel balls usually for 12 to 48 hours, with a weight of distilled water substantially double the weight of the oxide mixture.

Before agglomeration, the ground product may undergo a preliminary heat treatment consisting of a pre-sintering at a temperature comprised between 700° C. and 1250° C., either in air or in an atmosphere which is a mixture of nitrogen and oxygen, the quantity of oxygen being comprised between 0.5 and 20% by volume, for a period of about 4 hours. Cooling takes place respectively in air or pure nitrogen.

The product obtained is reground under the conditions indicated previously for the first grinding.

Capacitors of the desired shape are obtained either by compression, by drawing or by extrusion etc., possibly with the addition of an organic binding agent and/or organic lubricant which is evaporated by a preliminary heat treatment.

Annealing takes place at a temperature comprised between 1100° C. and 1400° C., in an air-tight oven, the annealing atmosphere being either air or a mixture of nitrogen and oxygen, the quantity of oxygen being comprised between 0.5 and 20% by volume. It is followed by a slow cooling for about 15 hours, which takes place respectively in air or in pure nitrogen.

The invention will be better understood by means of the following non-limitative examples:

Example 1

Start with a mixture comprising 99.65 molecules of iron oxide $Fe_2O_3$ and 0.35 molecules of tantalum oxide $Ta_2O_5$ that is 198.0 grammes of iron oxide $Fe_2O_3$, and 2.0 grammes of tantalum oxide $Ta_2O_5$. These oxides are ground and closely mixed in an iron mill with steel balls for about 24 hours.

The mixture is then compressed in the form of discs. The discs are subjected to a heat treatment at 1225° C. for about 4 hours, in a mixture of nitrogen and oxygen, the quantity of oxygen being equal to 5% by volume. Cooling is effected in about 15 hours in a nitrogen atmosphere.

This material has the following properties:

Permittivity, $\epsilon=2{,}200{,}000$ approx. } at frequency
Tangent of the loss angle, tg $\delta=1.4$ approx. } of 50 c./s.

in the following conditions:

Temperature, 20° C. approximately.
Measuring voltage, 1 volt approximately.

Example 2

Starting with a mixture comprising 99.3% molecules of iron oxide $Fe_2O_3$ and 0.70% molecules of tantalum oxide $Ta_2O_5$, that is 196.0 grammes of iron oxide $Fe_2O_3$ and 4.0 grammes of tantalum oxide $Ta_2O_5$. These oxides are ground and closely mixed in an iron mill with steel balls for about 24 hours.

The mixture is then compressed in the form of discs. The discs are subjected to a heat treatment at 1240° C., for about 4 hours, in a mixture of nitrogen and oxygen comprising 5% of oxygen by volume.

Cooling then takes place for about 15 hours in a nitrogen atmosphere.

This material has the following properties:

Permittivity, $\epsilon=6{,}500{,}000$ approx. } at frequency
Tangent of loss angle, tg $\delta=2.1$ approx. } of 50 c./s.

in the following conditions:

Temperature, 20° C. approx.
Measuring voltage, 1 volt approx.

Example 3

Starting with a mixture comprising 98.2% molecules of iron oxide $Fe_2O_3$ and 1.8% molecules of tantalum oxide $Ta_2O_5$, that is 190.0 grammes of iron oxide $Fe_2O_3$ and 10 grammes of tantalum oxide $Ta_2O_5$. These oxides are ground and thoroughly mixed in an iron mill with steel balls for about 24 hours.

The mixture is then compressed in the form of discs. The discs are then subjected to a heat treatment at 1240° C., for about 4 hours in a mixture of nitrogen and oxygen comprising 5% of oxygen by volume. Cooling then takes place for about 15 hours in a nitrogen atmosphere.

This material has the following properties:
Permittivity, $\epsilon=7{,}000{,}000$ approx. } at frequency
Tangent of loss angle, tg $\delta=2$ approx. } of 50 c./s.

in the following conditions:

Temperature, 20° C. approximately.
Measuring voltage, 1 volt approximately.

It is to be understood that the foregoing description of specific examples of this invention are not to be considered as a limitation of its scope.

What we claim is:
1. A dielectric material with very high values of per- mittivity consisting essentially of the product formed of a homogeneous mixture of $Fe_2O_3$ with 0.05 to 5% of $Ta_2O_5$ by weight of the total mixture by the process of forming said mixture into a body of the desired configuration, heating said body to a temperature of 1100° to 1400° C. in an atmosphere containing 0.5 to 20% of oxygen by volume for a period of about four hours, followed by a slow cooling for about 15 hours in an atmosphere comprising nitrogen with up to approximately 20% oxygen by volume.

2. A dielectric material according to claim 1 in which the mixture of powders is subjected to a presintering at a temperature comprised between 700° C. and 1250° C. in an atmosphere containing between 0.5 and 20% by volume of oxygen, for about 4 hours followed by cooling respectively in nitrogen containing up to 20% oxygen by volume and a fresh grinding, prior to said forming.

References Cited in the file of this patent
UNITED STATES PATENTS
2,911,370    Kulcsar _____ Nov. 3, 1959

OTHER REFERENCES

Dielectric Materials, etc., Von Hippel, editor, pub. by John Wiley & Sons, New York, 1954, pp. 188, 189.

Mellor: Comp. Treat. Inorg. and Theor. Chem., vol. 9, Longmans Green & Co., New York, 1929, pp. 900–910.